United States Patent Office 3,366,111
Patented Jan. 30, 1968

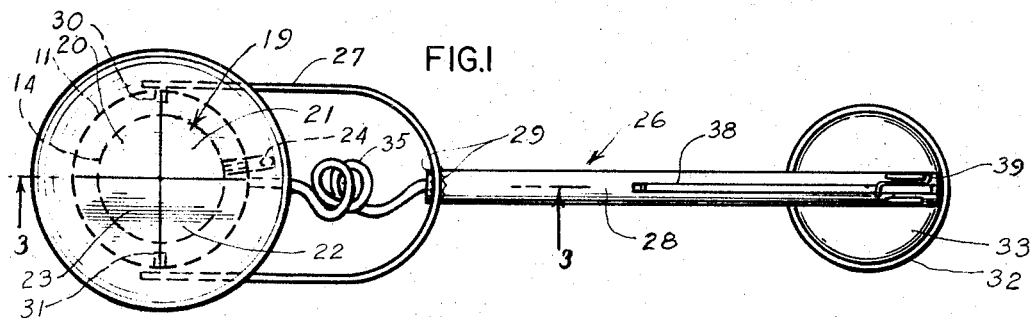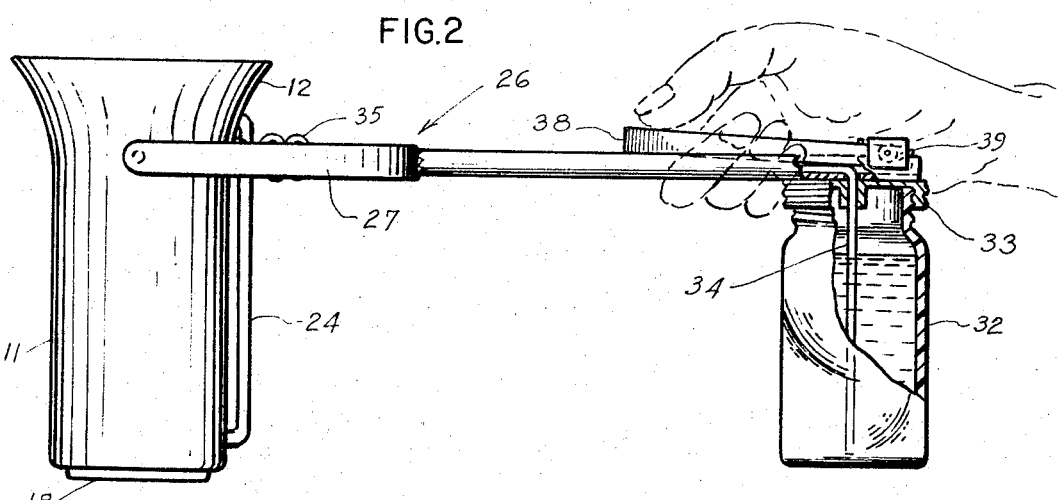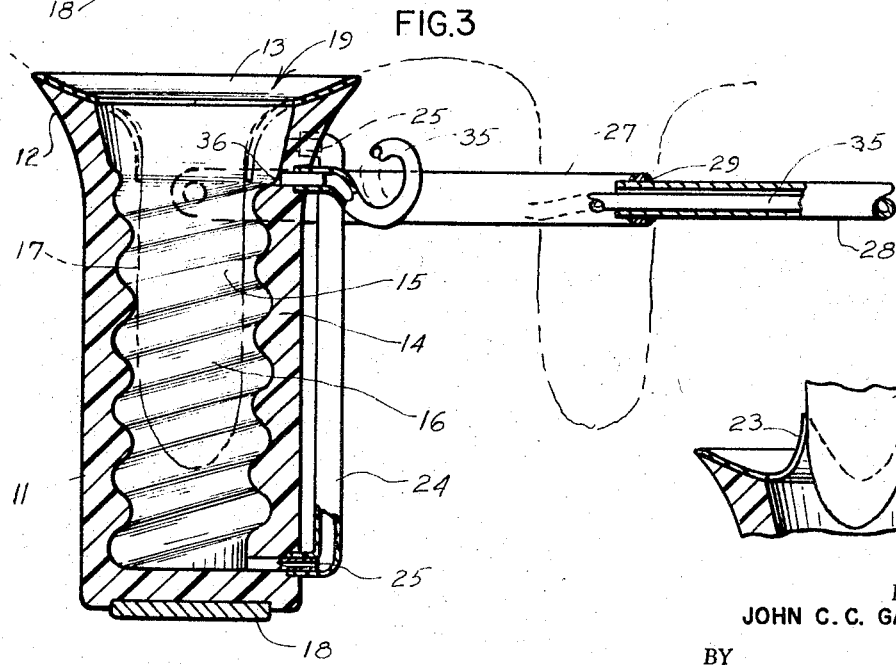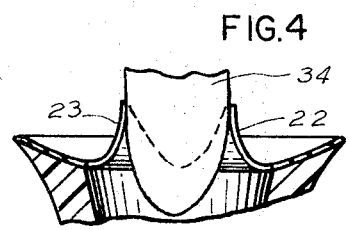

3,366,111
DEVICE FOR APPLICATION OF MEDI-
CATED LIQUIDS TO TEAT SKIN OF
FEMALE QUADRUPEDS
John C. C. Gandier, Dorval, Quebec, Canada, assignor to
American Home Products Corporation, New York,
N.Y., a corporation of Delaware
Filed Sept. 15, 1965, Ser. No. 487,517
6 Claims. (Cl. 128—260)

ABSTRACT OF THE DISCLOSURE

A device for applying treatment liquids or semi-liquids to the teat skin of a quadruped wherein the teat-receiving receptacle is provided along its side with a liquid level indicating sight glass. The teat-receiving receptacle, which is generally cylindrical in shape, is provided with a slitted flexible diaphragm at its upper end and through which the animal teat may be introduced into the interior of the receptacle into contact with the treatment agent. The receptacle is also provided with an inner lining or core formed in the shape of a helical screw thread. A reservoir for supplying treatment agent to the interior of the receptacle is also provided, and this is in communication with the interior of the receptacle through a conduit which runs along the supporting handle provided for holding the device, this handle serving to permit the device to be held for use in the application of treatment agents to the teat skins of animals with the receptacle and reservoir spaced from each other at opposite ends of the supporting handle.

---

The present invention relates to a device for the application of liquid or semi-liquid materials to the teat skin of quadrupeds with special reference to cows, goats, sheep and mares. The materials referred to are antiseptic solutions or suspensions generally called "teat dip."

An important and integral part of present mastitis and milk quality control programs is the coating or dipping of the cow's teats in antiseptic and/or film coating over the teat and external meatus of the teat protecting it from the spread of infection, dirt and flies between milkings, and making it easier to clean in preparation for the next milking because this film coating or antiseptic material is formulated to wash off readily as part of the art.

My invention relates to an apparatus having the utility of providing an easy, quick, economical and efficient means for the application of an antiseptic or skin protective fluid commonly referred to as teat dip. My invention provides for the teat dip material to be applied to the full extent of the teat for its full length in contact with the inflation of a milking machine, as this is the area and extent of the teat which should be coated to protect it between milkings. The area of teat skin touched by the inflation is of prime importance because the inflations may become infected from the skin and carry pathogenic and milk quality damaging organisms from teat to teat or into the milk.

In the past liquid disinfectant media commonly called teat dips have been applied by the operator, lifting a cup manually to encompass and immerse the lower extremity of a teat. This procedure was slow, wasteful of material and inefficient. Usually only the lower part of the teats was covered in the treatment. In my invention, the teat is centered in the mouth of a funnel-like device with a relatively small aperture leading to a casing having the usual shape of a teat and large enough to encase the range of teat sizes of domestic cows, the aperture at the entrance to the core and the spiral lining being made of soft flexible rubber to permit of some expansion. The inner lining or core of this apparatus is spiral and fluted so that the teat comes to rest against the convolutions. This design and construction allows the teat dip fluid to pass freely spirally either up or down the inner aspect of the core of the apparatus' casing in contact with the teat skin even though the teat be of such size that it fills the apparatus. The upper end of the device is funnel-like, declining in diameter to the relatively smaller aperture by which the teat passes into the cylinder or open core of the apparatus. The container is made of soft rubber or other suitable material which serves to remove excess teat dip and retain it in the lower part for future use as the teat is removed following application. The preferred material out of which my new apparatus is made may be black rubber, as used for the inflation of milking machines.

Visual knowledge that the approximately cylindrical lower part of the container is adequately charged or loaded with teat dip is supplied by a tube made of transparent plastic or other suitable material inserted as a standpipe on the exterior wall of the container. The container or teat receiving receptacle is mounted in gimbals to ensure upright or perpendicular position during use. The gimbals are attached to a suitable handle and a feeder line for the teat dip is incorporated within the handle and connected to a reservoir of teat dip. A trigger or plunger type pump system may be conveniently used to propel additional amounts of the teat dip to the convolutions of the core of the device if filling is required as seen by the standpipe. Alternatively, topping up may be carried out by gravity from a suitable reservoir.

My invention may be best described with reference to the annexed drawing showing a preferred modification thereof. In this drawing:

FIGURE 1 is a top view of my device showing the three chief elements thereof, the teat receiving receptacle, the supporting gimbal, and a receptacle providing a supply of the medicated treatment liquid;

FIGURE 2 is a side elevational view of the complete device, a portion of the side wall of the medicated liquid receptacle being cut away to show the liquid disinfectant therein;

FIGURE 3 is a partial cross-sectional view taken on the line 3—3 of FIGURE 1, certain portions thereof being shown in elevation. In this view the dotted line shows in a general way the position of the udder of an animal, such as a cow, when the device is being used to treat one of the teats thereof; and FIGURE 4 is a detail view showing the upper diaphragm closure at the upper part of the teat receiving receptacle when one of the teats treated is being removed therefrom.

As illustrated, my device for applying a medicated liquid, such as a liquid disinfectant, to the teat skin of an animal quadruped includes the teat receiving receptacle 11 which is generally cylindrical in cross-section, but which is formed at its uppermost part with an outwardly flared wall 12 to provide an opening 13 into the receptacle of somewhat greater cross-sectional area than that of the main portion of the cylindrical body 11 below the opening. This receptacle may advantageously be constructed from soft rubber or from some other suitable plastic-type material, and the inner lining or core thereof, designated by the numeral 14, is formed in the shape of a helical screw thread 15. This screw thread, of any desired pitch, which extends from a point adjacent opening 13 to a point adjacent the bottom of the teat receiving receptacle 11, may be cut into the inner core 14, or formed in this part of the receptacle 11 by casting if the entire device is cast or molded.

The interior 16 of the teat receiving receptacle 11 is so propotioned that when an animal teat undergoing treatment is placed therein the teat skin 17 thereof fits fairly closely to the inner lining or core 14 which is shaped in the form of screw thread 15 as previously described. The diameter of the teat receiving receptacle below the opening 13, and the length or extent of the cylindrical portion thereof, are so proportioned with regard to the particular type of animal teat to be treated therein that the entire teat will just fit therein with the outer skin 17 thereof in contact with, or close to, the screw threaded inner lining 14 with its threads 15.

A weighted element, or a relatively heavy counterbalancing member, 18, is secured to the bottom of the receptacle 11 so that it will remain in an upright position under all circumstances of use since it is suspended in a gimbal as subsequently explained.

The outwardly flared upper portion 12 of the receptacle 11, adjacent inlet 13, is provided with a thin, flexible rubber diaphragm 19 closure. The diaphragm 19 is slit crosswire, by slits at right angles to each other, as shown in FIGURE 1, to provide the four flaps or sectors 20, 21, 22 and 23, each capable of depending independently within the inlet opening 13. While thus providing a relatively flat closure at the inlet opening end of the teat receiving receptacle 11, these flaps or sectors give along their slitted edges, as shown in FIGURES 3 and 4, to permit entry of the end of an animal teat and removal of the teat from the receptacle 11 when the device is in use for treating animal teats with a treatment liquid. As a result of the resiliency of the thin rubber diaphragm 19 the flaps 20, 21, 22 and 23 spring back to their original position, after the teat is fully removed from the receptacle 11, again providing a closure for the enlarged funnel-shaped opening 13, at the upper end of the teat receiving receptacle 11, when the treatment has been completed.

At the side of the receptacle 11 there is provided a liquid level indicator or sight glass 24, which is preferably made, either wholly or partially, of some transparent or translucent material such as glass or plastic. As shown in FIGURE 3, this indicator may be in the form of a standpipe connected, at both upper and lower ends, with the interior of the teat receiving receptacle 11 through the conduits 25, 25 formed in the rubber or plastic material out of which the teat receiving receptacle 11 is constructed. As shown, this level indicator or standpipe is in communication with the interior of the teat receiving receptacle 11 at both upper and lower ends. Liquid within the standpipe 24 can thus flow in either direction back into the interior of teat receiving receptacle 11. The rapid insertion of a teat into the teat receiving receptacle 11, and consequent displacement of treatment liquid, will not result in any loss of liquid from the apparatus such as might occur if the upper end of standpipe 24 were open to the atmosphere.

By placing the sight glass 24 in communication with the interior of the receptacle the level of medicated treatment liquid in the receptacle is at all times immediately apparent, and may be readily ascertained by visual observation. If in short supply in the teat receiving receptacle 11 further amounts of treatment liquid may be added, or if too much is present, excess may be removed.

The teat receiving receptacle 11 is suspended in a gimbal 26 which includes yoke 27 and hollow handle 28 suitably connected together, as by welding, at 29. As shown in FIGURES 1 and 2, adjacent the end of the members of the fork comprising the yoke 27, there are provided two pivots 30 and 31, which may be short rods or studs extending inwardly from the legs of the yoke. These studs are adapted to seat in apertures for receiving the same formed in the exterior wall of receptacle 11, thus permitting the receptacle to swing freely with reference to yoke 27 and handle 28. As the receptacle 11 is provided at its bottom with counterbalancing weight 18, it is evident that regardless of what position yoke 27 and handle 28 may be held in, the receptacle 11, swinging about pivots 30 and 31, will remain in a strictly vertical position. Since the device, in use, is normally held by the handle 28, which may or may not be maintained in a strictly horizontal position, that gimbal suspension of the receptacle 11 insures that it will always remain in an upright and substantially vertical position when the apparatus is in use.

To supply the interior 16 of teat receiving casing 11 with the treatment liquid, which as previously explained may be a liquid disinfectant or teat dip, there is provided at the exterior end of the hollow handle 28 a receptacle 32, which receptacle provides a reservoir for the treatment liquid. This receptacle is provided with internally screw-threaded cover 33, which is screwed in place on the top of the receptacle. To this cover 33 there is secured, as by welding or otherwise, the hollow handle 28 at one end thereof. Extending down through cover 33 and into the treatment liquid within the receptacle 32 is the discharge tube 34, which is in communication with conduit 35, preferably formed of a plastic tubing. Conduit 35 is positioned within, and runs along, the hollow handle 28, being in communication with the interior 16 of receptacle 11 through an opening 36 formed in the side wall. In this way it is possible to transfer treatment liquid from the reservoir 32 to the receptacle 11. To assist in this transfer there may be provided a finger-actuated pump 37 (FIGURE 2), which includes a finger-actuated pump bar 38 capable of being pressed against the action of spring 39 to pump treatment liquid from the interior of receptacle 32 through conduits 34 and 35, and through aperture 36, into the interior 16 of teat receiving receptacle 11. In this way of the level of liquid may be maintained at any desired level, the sight glass 24 permitting visual observation of that level at all times that the apparatus is in use.

If desired, in place of the pump 37, the level of liquid in the interior of the teat receiving receptacle 11 could also be maintained by a simple gravity flow arrangement from a reservoir for the liquid located at a higher level than that of the teat receiving receptacle.

When it is desired to utilize the device in the treatment of animal teats, such as, for example, for the purpose of coating the skin thereof with an antiseptic and/or skin protectant fluid, an initial amount of the disinfectant or other liquid is first placed in the interior 16 of the teat receiving receptacle 11. This may be readily accomplished by pumping this liquid from the receptacle 32 which provides a reservoir of treatment liquid, or the liquid may be otherwise placed in the receptacle through the opening 13 at the top thereof across which slitted flexible rubber diaphragm 19 extends.

When a teat to be treated is to be introduced into the interior 16 of the teat receiving receptacle 11, the end of the teat is pressed downwardly against the action of the slitted flexible rubber diaphragm 19 to insert it into the receptacle. The flaps 20, 21, 22 and 23 assume the position shown in dotted lines in FIGURE 3 of the drawing during this teat introduction step. When the teat is fully in position, as shown in outline by the dotted lines in FIGURE 3, the flaps 20, 21, 22 and 23 rest loosely against the skin of the teat, the treatment liquid being at all times during the treatment fully in contact with all portions of the teat skin throughout its full area and extent. When the treatment with the antiseptic liquid or other treatment liquid has been completed, the teat 39 is removed, as shown in FIGURE 4, and flaps 20, 21, 22 and 23 of the flexible rubber diaphragm 19 assume the upwardly-extending position shown in FIGURE 4 wherein they serve to remove excess liquid adhering to the teat. This excess treatment liquid is thus not lost by adhering to the treated teat, but falls back into the receptacle 11 to be available when the next teat is treated.

If necessary or desirable at any time to introduce further amounts of the treatment liquid into the interior 16 of the receptacle 11, it is only necessary to actuate pump 37. There may thus be provided at all times an adequate amount of treatment liquid to the apparatus, the level of liquid therein being readily observable in sight glass 24.

In this way the device can be used successively for treating, with any of various liquid treating agents, any number of animal teats, two of which comprising the udder 40 are shown in dotted outline in FIGURE 3.

The level of liquid may be constantly maintained within the receptacle 11, and excess liquid is removed from the teat on its being withdrawn from receptacle 11 after treatment is completed, by means of the flexible rubber diaphragm 19. The removed excess liquid is not lost but drops back within the receptacle 11 and is available for further treatment.

Simply by holding the handle 28 or the yoke 27 in any generally horizontal, or in fact in any moderately inclined position, the operator is assured that the receptacle 11 will be suspended in a strictly vertical position since it is pivoted at 30, 31 and provided with weighted means 18 at its bottom portion to hold it upright.

Since a teat undergoing treatment, as position within receptacle 11, closely fits the available interior space thereof, it is evident that, upon its removal, any treatment liquid adhering to the skin surfaces thereof will tend to flow back in the groove of the screw thread 15 formed in the inner core 14 of the rubber or plastic material comprising the receptacle, thereby ensuring that liquid is not lost by escaping through the opening 13 and thus leaving the apparatus, but flows back in the groove of screw thread 15 so that it remains within receptacle 11. These threads ensure adequate coating of the whole surface of a teat with teat dip, as they will prevent the teat from adhering to the interior wall of the teat receiving receptacle 11, which might perhaps occur if this interior wall were smooth. Furthermore, when the teat of the animal is inserted into the teat receiving receptacle 11, the threads 15 will impart a rotating motion to the liquid within the teat receiving receptacle 11 which is being forced upwardly by displacement due to insertion of the teat. Furthermore, upon inserting the teat into the receiving receptable 11, the shoulders of the threads 15 exert a rubbing, smearing, or painting action on the teat skin which touches them. This action is an additional assurance that the teat skin will be thoroughly coated with the liquid. Moreover, when the teat is being withdrawn from the receiving receptacle 11, the threads 15 will remove a large proportion of the excess liquid which is thus saved within the receptacle 11.

When the device is to be used an initial amount of teat dip or similar medicated or antiseptic liquid may be pumped into the teat receiving receptacle 11, or simply allowing to flow thereinto, by gravity, from a receptacle for such liquid at a higher level than that of the teat receiving receptacle. A teat is placed in the receiving receptacle 11, and teat dip or other treatment liquid circulates around it in a generally spiral direction. If the amount of liquid is seen, by visual observation of the standpipe or level indicator sight glass 24, to be insufficient to coat the teat fully from top to bottom, additional treatment liquid may be introduced into the teat receiving receptacle, either by pumping or by gravity flow, as previously explained.

The treatment liquid remaining in the teat receiving receptacle 11 is retained therein after completion of one treatment operation, and is available for use in treating the next teat which is introduced, for treatment into the receptacle 11. The operator, by observation of the liquid level therein, can readily control the amount of treatment liquid in said receptacle so that enough is available to completely coat the teat.

Changes and modifications may of course be made in my device as herein described and the resulting changed or modified device would still be within the scope of my invention, as defined by the appended claims.

I claim:

1. A device for treating the teat of an animal with a treatment liquid which comprises, in combination, a hollow open-ended teat-receiving receptacle adapted to contain a treatment liquid, said teat-receiving receptacle being generally cylindrical in form, and being provided with an inner lining on the interior thereof, said inner lining being formed with an inwardly-extending screw thread which contacts portions of the skin of an animal teat when said device is being used; a slitted flexible diaphragm closing said open end of said teat-receiving receptacle, through which diaphragm the teat of an animal may pass so that it may be positioned in the interior of said teat-receiving receptacle for treatment; a standpipe serving as a liquid level indicator attached to the side of said teat-receiving receptacle, and connected with the interior thereof at both upper and lower junction points therewith; and means for supplying treatment liquid, as needed, to the interior of said teat-receiving receptacle.

2. A device for treating the teat of an animal with a treatment liquid which comprises, in combination, an open-ended teat-receiving receptacle adapted to contain a treatment liquid when the device is being used to treat an animal teat, said teat-receiving receptacle being generally cylindrical in form and provided, at the lower portion thereof, with a weighted element; a gimbal provided with a forked portion and a handle bar portion for supporting said teat-receiving receptacle, said teat-receiving receptacle being positioned within the fork of said gimbal while the handle bar portion thereof is held when said device is in use, said gimbal and said weighted element of said teat-receiving receptacle cooperating to insure that said teat-receiving receptacle is supported in a substantially vertical position regardless of the manner in which said handle bar portion of said gimbal is held; a slitted flexible diaphragm forming a partial closure at one end of said teat-receiving receptacle through which the teat of an animal may be inserted in order that said teat may be positioned within said teat-receiving receptacle for treatment; and liquid level indicator means secured to said teat-receiving receptacle whereby the level of liquid therein may be observed.

3. A treatment device adapted to be held by an operator when used to treat the teat of an animal with a treatment liquid, said device comprising, in combination, an open-ended teat-receiving receptacle into which the teat of an animal may be introduced for the purpose of treating said teat with treatment liquid; means for indicating the level of treatment liquid in said teat-receiving receptacle; a reservoir receptacle containing treatment liquid; supporting means for supporting both said teat-receiving receptacle and said reservoir receptacle from a handle bar adapted to be grasped by an operator using said device; conduit means placing said reservoir receptacle and said teat-receiving receptacle in communication with each other, whereby treatment liquid may be transferred from said reservoir to said teat-receiving receptacle; and gimbal-supporting means forming part of said handle bar by which said teat-receiving receptacle may be suspended in a substantially vertical position when being used by an operator treating animal teats regardless of the angle at which said handle bar and gimbal is held by said operator.

4. A treatment device adapted to be held by an operator when used to treat the teat of an animal with a treatment liquid, said device comprising, in combination, an open-ended teat-receiving receptacle into which the teat of an animal may be introduced for the purpose of treating said teat with treatment liquid; means for indicating the level of treatment liquid in said teat-receiving receptacle; a reservoir receptacle containing additional treatment liquid; handle bar means for supporting both said teat-receiving receptacle and said reservoir receptacle, said supporting means including a portion thereof which is pivotally supported with respect to said teat-receiving receptacle so that said teat-receiving receptacle may swing through an angle with respect to said supporting means; a conduit extending between said teat-receiving receptacle and said reservoir receptacle and placing said receptacles in communication, whereby treatment liquid may be transferred therebetween; finger-actuated pump means for transferring treatment liquid from said reservoir receptacle through said conduit and into the interior of said teat-receiving receptacle whereby it may be available for the treatment of teats; and a weighted element positioned in said teat-receiving receptacle at the end thereof opposite said open end whereby, in cooperation with said pivotal support for said teat-receiving receptacle, said receptacle is held upright in a substantially vertical position regardless of the position in which said handle bar supporting means is held by the operator using said device.

5. A treatment device adapted to be held by an operator and used to treat the teats of animals with treatment liquid, said device comprising, in combination, an open-ended teat-receiving receptacle with weighted bottom, said receptacle being provided, at its open end, with a displaceable flexible diaphragm partial closure through which the teat of an animal may be passed in introducing said teat into said teat-receiving receptacle for treatment, the interior of said teat-receiving receptacle being provided with helical screw thread liner portions which contact with, and rub against, the sides of the animal teat when said device is in use; means for visually indicating the level of treatment liquid in said teat-receiving receptacle; a reservoir receptacle containing additional amounts of treatment liquid; supporting means adapted to be grasped by an operator for supporting both said teat-receiving receptacle and said reservoir receptacle, said supporting means being pivotally connected, at one end thereof, with said teat-receiving receptacle whereby said receptacle may swing freely with respect to said supporting means; and a conduit extending between said reservoir receptacle and said teat-receiving receptacle whereby the latter is placed in communication with the former, thereby permitting the transfer of treatment liquid therebetween; said bottom weighted teat-receiving receptacle pivotally engaged with respect to said supporting means remaining in a substantially vertical position regardless of the angle at which said supporting means is held by the operator.

6. A device for treating the teat of an animal which device, when in use, may be supported by an operator using the same, said device comprising, in combination, a hollow cylindrical teat-receiving receptacle adapted to receive an animal teat undergoing treatment, said receptacle being formed with an open end thereof partially closed by a slitted flexible diaphragm through which the end of an animal teat may be pushed so that it may enter within the interior of said teat-receiving receptacle when said device is in use; a spiral screw thread formed on the interior surface of said hollow cylindrical teat-receiving receptacle, said screw thread being arranged so that, when an animal teat undergoing treatment is positioned therein, the inwardly protruding portions of said screw thread come into contact with the exterior of said animal teat; gimbal means, including a handle supporting portion adapted to be grasped by an operator, for supporting said teat-receiving receptacle so that it remains in substantially vertical position regardless of the angle in which said handle supporting portion is held by said operator; and means for indicating to said operator the level of treatment liquid in said teat-receiving receptacle.

References Cited
UNITED STATES PATENTS

| | | | |
|---|---|---|---|
| 1,927,462 | 9/1962 | Marsh-Humn | 128—300 |
| 2,364,866 | 12/1944 | Meynier | 128—130 |
| 2,384,142 | 9/1945 | Spingler | 128—260 |
| 3,100,487 | 8/1963 | Bathish | 128—227 |

FOREIGN PATENTS

| | | |
|---|---|---|
| 628,093 | 2/1930 | France. |

ADELE M. EAGER, *Primary Examiner.*